(12) United States Patent
Teichrob et al.

(10) Patent No.: US 11,987,218 B2
(45) Date of Patent: May 21, 2024

(54) STAND FOR EQUIPMENT TRAILERS

(71) Applicant: Ty-Crop Manufacturing Ltd., Rosedale (CA)

(72) Inventors: Gary Wayne Teichrob, Rosedale (CA); Patrick Scott Mason, Cultus Lake (CA); Dennis Keith Ho, Abbotsford (CA); Clark Alan Friesen, Chilliwack (CA)

(73) Assignee: Ty-Crop Manufacturing Ltd., British Columbia (CA)

( * ) Notice: Subject to any disclaimer, the term of this patent is extended or adjusted under 35 U.S.C. 154(b) by 529 days.

(21) Appl. No.: 17/241,502

(22) Filed: Apr. 27, 2021

(65) Prior Publication Data

US 2022/0032882 A1 Feb. 3, 2022

Related U.S. Application Data

(60) Provisional application No. 63/057,542, filed on Jul. 28, 2020.

(51) Int. Cl.
*B60S 9/08* (2006.01)
*B60D 1/66* (2006.01)
*B62D 63/06* (2006.01)
*F16F 1/36* (2006.01)

(52) U.S. Cl.
CPC ............... *B60S 9/08* (2013.01); *B60D 1/66* (2013.01); *B62D 63/06* (2013.01); *F16F 1/3605* (2013.01); *F16F 2224/025* (2013.01)

(58) Field of Classification Search
CPC ... B60S 9/08; B60D 1/66; B62D 63/06; F16F 1/3605; F16F 2224/025
See application file for complete search history.

(56) References Cited

U.S. PATENT DOCUMENTS

| | | | | |
|---|---|---|---|---|
| 2,852,883 | A * | 9/1958 | Walsh | A47C 7/002 16/42 T |
| 3,219,362 | A * | 11/1965 | Epstein | B60S 9/02 267/153 |
| 3,666,290 | A * | 5/1972 | Dalton | B60S 9/02 267/153 |
| 4,176,825 | A * | 12/1979 | Schwebke | B60S 9/04 254/94 |

(Continued)

FOREIGN PATENT DOCUMENTS

| | | | | |
|---|---|---|---|---|
| CA | 2793576 A1 * | 3/2013 | | B64C 27/001 |
| CA | 3116250 A1 * | 1/2022 | | B60D 1/66 |

(Continued)

*Primary Examiner* — Jacob B Meyer
(74) *Attorney, Agent, or Firm* — McAndrews, Held & Malloy, Ltd.

(57) ABSTRACT

A method and system for supporting trailers carrying mechanical equipment, such as hydraulic fracturing oil and gas equipment are provided. One, two or at least three supports extend from the trailer toward ground and are configured to partially support the trailer when in contact with ground, in addition to any axle groups that exist on the trailer. At least one device configured to absorb, damp, or both absorb and damp vibrations from the mechanical equipment during operation is provided. Each device is operatively coupled to, for example integrated with, a corresponding one of the support structures.

21 Claims, 15 Drawing Sheets

(56) References Cited

U.S. PATENT DOCUMENTS

| | | | | |
|---|---|---|---|---|
| 4,417,637 A * | 11/1983 | Hardy | B60V 1/00 | 254/423 |
| 4,462,612 A * | 7/1984 | Dreyer | B60S 9/04 | 212/301 |
| 4,473,239 A * | 9/1984 | Smart | B66C 23/78 | 248/677 |
| 4,634,144 A * | 1/1987 | Ringe | B60S 9/02 | 254/419 |
| 4,824,136 A * | 4/1989 | Baxter | B60S 9/04 | 254/419 |
| 5,054,805 A * | 10/1991 | Hungerink | B60S 9/08 | 254/419 |
| 5,785,330 A * | 7/1998 | Shoquist | B60S 9/04 | 280/475 |
| 5,785,341 A * | 7/1998 | Fenton | B62D 53/0821 | 280/441 |
| 6,099,016 A * | 8/2000 | Peveler | B60S 9/08 | 254/419 |
| 6,142,500 A * | 11/2000 | Sargent | B60D 1/075 | 280/483 |
| 6,213,491 B1 * | 4/2001 | Southard, Jr. | B60D 1/66 | 280/475 |
| RE37,492 E * | 1/2002 | Shoquist | B60D 1/66 | 280/475 |
| 6,802,535 B1 * | 10/2004 | Alguera Gallego | B60S 9/02 | 248/188.8 |
| 6,991,050 B1 * | 1/2006 | Sanford | B62D 53/0857 | 180/19.1 |
| 7,128,340 B1 * | 10/2006 | Alguera Gallego | B60S 9/02 | 248/188.8 |
| 7,810,831 B2 * | 10/2010 | Wilkens | B62D 53/0871 | 280/441 |
| 2015/0175136 A1 * | 6/2015 | Griffin | B60S 9/08 | 81/119 |
| 2022/0032882 A1 * | 2/2022 | Teichrob | B60S 9/08 | |

FOREIGN PATENT DOCUMENTS

| | | | | |
|---|---|---|---|---|
| CN | 105691486 A | * | 6/2016 | |
| CN | 108945162 A | * | 12/2018 | ............. B60D 1/187 |
| CN | 112109822 A | * | 12/2020 | |
| CN | 112158124 A | * | 1/2021 | |
| CN | 216468457 U | * | 5/2022 | |
| CN | 115107620 A | * | 9/2022 | |
| DE | 3920632 A1 | * | 1/1991 | |
| DE | 102010025962 A1 | * | 1/2012 | ............. B60D 1/66 |
| DE | 102021115130 B3 | * | 2/2022 | |
| EP | 0336646 A1 | * | 10/1989 | |
| EP | 0398797 A1 | * | 11/1990 | |
| GB | 2317596 A | * | 4/1998 | ............. B60D 1/66 |

* cited by examiner

STAND FOR EQUIPMENT TRAILERS

CROSS-REFERENCE TO RELATED APPLICATIONS

This patent application claims the benefit of U.S. Provisional Patent Application No. 63/057,542, filed Jul. 28, 2020, which is incorporated by reference herein in its entirety.

FIELD OF THE INVENTION

The present invention pertains to the field of trailers for example in road tractor-trailer systems, and in particular to methods and systems for supporting the weight of equipment trailers, particularly where the equipment is mechanical in nature. In some cases the trailers can carry oil and gas equipment, for example hydraulic fracturing equipment found on a wellsite including hydraulic pumping systems.

BACKGROUND

Hydraulic fracturing operations typically require a number of fracturing trailers for operations at a well site. These trailers are typically immobile during wellsite operations. Despite this, they have their weight partially supported by the towing tractors that delivered the fracturing trailers to the site. It would be beneficial for these tractor assets to deliver the trailers and leave the site to operate elsewhere, especially as a fracturing job at a wellsite may take several weeks to complete.

Further, due to the large motors/engines and pumps mounted on a fracturing trailer, they are typically heavy and prone to vibrations during operation. The wide stance, damped suspension, and pneumatic tires of a tractor provide ample support at the front end of the trailer. While most fracturing trailers have landing supports, these are not strong enough to support a vibrating trailer during operations. More generally, trailer-mounted mechanical equipment can be heavy and produce mechanical vibrations, which can destabilize the trailer and lead to problems.

Accordingly, there is a need for a cost-effective system and method of supporting the heavy load of a trailer and damping or otherwise managing the vibrations of the trailer-mounted equipment, without requiring the tractor unit, that is not subject to one or more limitations of the prior art. This may allow the tractors to be removed from the wellsite or other operating site.

This background information is intended to provide information that may be of possible relevance to the present invention. No admission is necessarily intended, nor should be construed, that any of the preceding information constitutes prior art against the present invention.

SUMMARY

An object of the present invention is to provide methods and systems for supporting the weight of a trailer holding operating mechanical equipment, such as an operating fracturing pump trailer, and limiting, minimizing or otherwise safely or reliably withstanding vibrations of the mechanical equipment.

In accordance with an aspect of the invention, there is a system provided to support the weight of an equipment trailer, for example a fracturing pump trailer, without a tractor. This system comprises one or more specifically designed supports which provide an interface between a surface, such as the ground or pads placed on the ground, and the trailer. The supports can be configured to absorb or dampen vibrations occurring due to mechanical equipment, when operating, which is carried on the trailer.

In accordance with an aspect of the invention, there is provided a system for supporting the weight of a trailer holding mechanical equipment when unsupported by a towing tractor. The system includes at least one support structure extending from the trailer toward ground. Each support structure is configured to partially support the trailer when in contact with ground, in addition to any axle groups that exist on the trailer. The system includes at least one device configured to absorb, damp, or both absorb and damp vibrations from the mechanical equipment during operation thereof. Each of the devices is operatively coupled to a corresponding one of the support structures. For example, the devices can be integrated into or coupled in series with the support structures. The devices may include springs, dampers, or a combination thereof. A device may be at least partially incorporated into a shaft of its corresponding support structure. A device may be at least partially incorporated into a footing of its corresponding support structure.

In accordance with an aspect of the invention, there is provided a method for supporting the weight of an equipment trailer, such as a fracturing pump trailer, without a tractor. This method includes supporting the trailer using specifically designed supports placed near to where such supports are conventionally placed. In some embodiments of the invention, one or more additional supports can be used to support the trailer in one or more other areas. These other areas may include the gooseneck portion, or other cantilevered or overhanging portion, of the trailer.

In accordance with another aspect of the invention, there is provided a method for tolerating or reducing vibrations through the use of springs, elastomers, or other shock-absorbing and/or damping devices, for example incorporated into the supports.

In accordance with another aspect of the invention, there is a system provided to allow the supports to withstand or reduce vibrations caused by the operating trailer. The system comprises one or more spring, elastomer puck, or other shock-absorbing and/or damping device or devices installed on at least one of the supports.

In accordance with another aspect of the invention, there is provided a method for supporting the weight of a trailer holding mechanical equipment when unsupported by a tractor. The method includes extending landing support structures until the trailer is raised to allow removal of the tractor. The method further includes inserting a load bearing mechanism into the landing support structures. The method further includes retracting the landing support structures to allow the load bearing mechanism to support a weight of the trailer. The method further includes attaching a gooseneck support structure at a tow bar or similar attachment of the trailer. The method further includes extending the gooseneck support structure to support the gooseneck of the trailer. The method may further include extending the gooseneck support structure further to provide a lifting force on the gooseneck to compress a spring internal to the gooseneck support structure.

In accordance with another aspect of the invention, there is provided method for supporting the weight of an operating hydraulic fracturing trailer when unsupported by a tractor. The method includes providing at least one support structure extending from the trailer toward ground and configured to partially support the trailer when in contact with ground, in addition to any axle groups that exist on the trailer. The method further includes providing a device to absorb and/or damp vibrations from the operating trailer. In some embodiments, the at least one support structure includes or is coupled in series with the device to absorb and/or damp vibrations. In some embodiments, the at least one support structure is separate from said any axle groups that exist on the trailer and wherein the at least one support structure is also separate from any axle groups that are separate from and support the trailer.

BRIEF DESCRIPTION OF THE FIGURES

Further features and advantages of the present invention will become apparent from the following detailed description, taken in combination with the appended drawings, in which.

DETAILED DESCRIPTION

Embodiments of the present invention provide methods and systems for supporting a trailer holding mechanical equipment, without a tractor being hooked up to the trailer. Embodiments of the present invention provide methods and systems for supporting the weight and minimizing vibrations of an operating fracturing pump trailer without a tractor.

According to some embodiments of the present invention, a system is provided for supporting the weight of an operating hydraulic fracturing trailer when unsupported by a tractor. In some embodiments, the system includes at least three points of contact between the ground and the trailer, in addition to any axle groups that exist on the trailer. In some embodiments, the system includes less than three, for example, one or two points of contact between the ground and the trailer. The system further includes a device to absorb and/or damp vibrations from the operating trailer.

Also according to some embodiments of the present invention, a method is provided for supporting the weight of an operating hydraulic fracturing trailer when unsupported by a tractor. In some embodiments, the method includes providing at least three points of contact between the ground and the trailer, in addition to any axle groups that exist on the trailer. In other embodiments, the method includes providing less than three, for example, one or two points of contact between the ground and the trailer. The method further includes providing a device to absorb and/or damp vibrations from the operating trailer.

A potential benefit of supporting a trailer holding mechanical equipment, such as a fracturing pump trailer, is the ability to remove tractors from the site. This frees up the tractor assets to work elsewhere, prevents the need for drivers or operators to linger onsite, and decreases the footprint of the site during operations.

Figure 1:
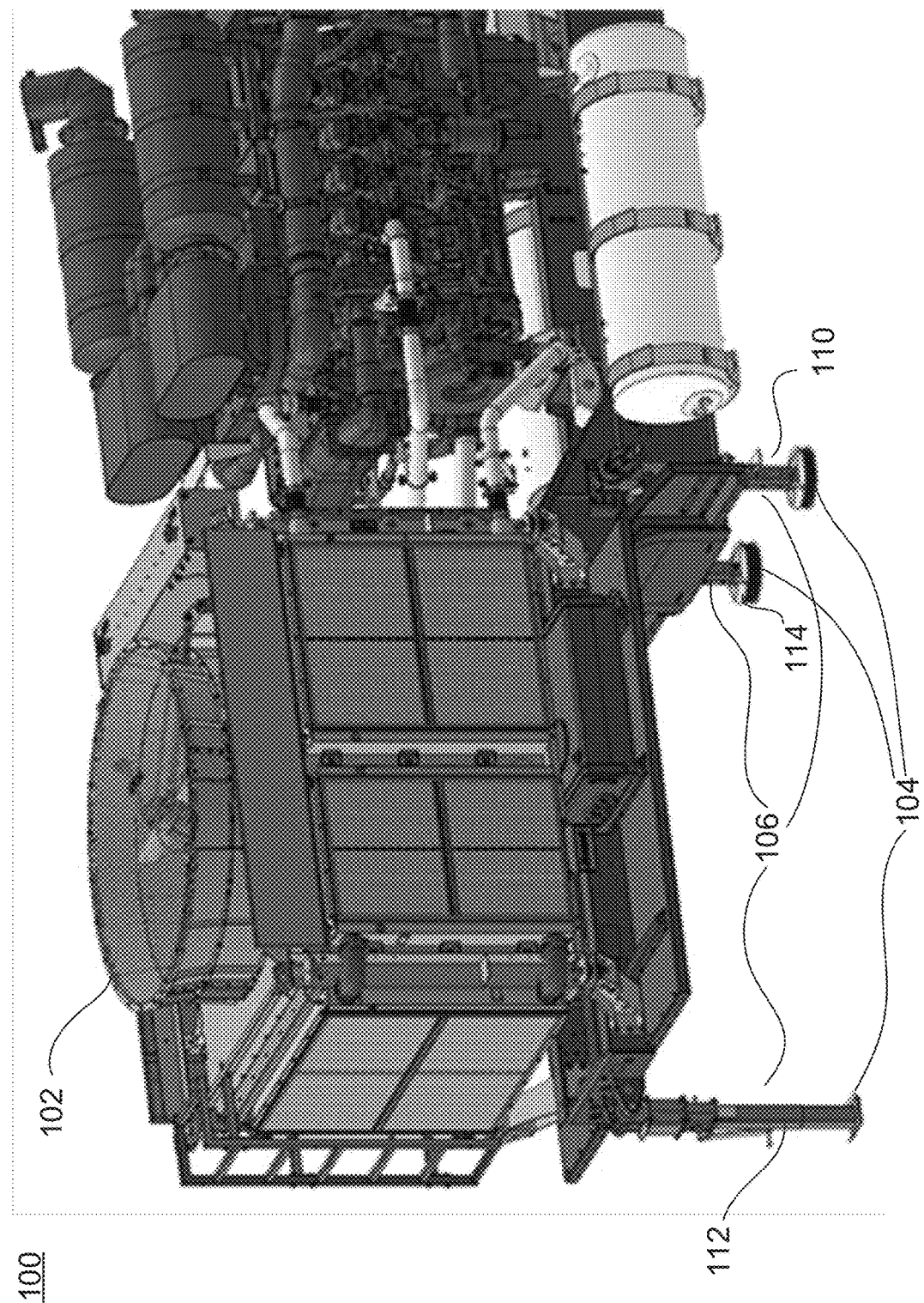
FIG. 1 illustrates a support system with three supports, according to an embodiment of the present invention.

FIG. 1 is an example of a system 100 for supporting the weight of an operating hydraulic fracturing trailer 102 when unsupported by a tractor. In the illustrated embodiment, the system 100 includes three points of contact 104 between the ground and the trailer 102, in addition to any axle groups (not shown) that exist on the trailer 102. In embodiments where the support system includes, consists of, or consists essentially of three supports 106, two supports 106 may be placed near the conventional location of the trailer landing gear, referred to as landing supports 110, and an additional support placed near an overhung or cantilevered portion (e.g. the gooseneck) of the trailer. The overhung or cantilevered portion is a part of the trailer that extends forward of the wheels and is supported at least in part by rigidity of the trailer structure. A gooseneck is a well-known type of such a trailer portion, and it should be understood that the term "gooseneck" as used herein can be readily replaced with another type of overhung or cantilevered trailer portion. This additional support is referred to as a gooseneck support 112, regardless of the type and configuration of the overhung or cantilevered portion.

While the various drawings presented herein illustrate a fracturing pump trailer, it should be understood that the present invention can be applied to other trailers carrying mechanical equipment, where the mechanical equipment is transported to a site and operated while still being mounted on the trailer. Such mechanical equipment can be used in a variety of fields, such as oil and gas extraction, mining, construction, forestry, or the like.

The system further includes a vibration mitigation device 114 to accommodate, absorb and/or damp vibrations from the operating trailer 102 caused by the pump, engine, or other equipment operating on the trailer 102. This may be achieved through absorbing and/or damping the vibrations, and through reinforcement of the supports 106. One, some or all of the supports can incorporate springs, dampers, or the like, or a combination thereof. The supports can be individually or cooperatively configured to mitigate problematic motion of the trailer due to operation of equipment mounted thereto.

In some embodiments, the support system 100 includes at least three supports 106 that interface between the trailer 102 and the ground or a ground cover. In other embodiments, the support includes fewer than three supports 106. For example, one or two of the illustrated supports can be omitted, provided that wheels and axles are supplied for additional support, and the provided supports are adequate for load bearing purposes. The number of supports, and their placement, can be configured based on operating requirements. For example, larger numbers of supports can be used to support greater loads. As another example, supports can be placed where needed to reduce mechanical stresses due to loads at various places. As another example, supports with integrated springs or dampers can be placed at locations which act to accommodate vibrations due to mechanical equipment of a certain type at a certain location on the trailer.

In various embodiments, one, more or all of the support structures (e.g. supports 106) are wheel-less support structures. That is, at least one support structure is separate from all axle groups that exist on the trailer and this at least one support structure is also separate from any axle groups that are separate from and support the trailer. Therefore, the support structures extend toward and contact ground without incorporating any wheels. This can provide for a simple system and also facilitate retaining the trailer in place during support.

In some embodiments, at least two of the supports 106 are fixed to the trailer 102 and are not removed or pivoted during transportation of the trailer 102. In other embodiments, one, some or all of the supports are pivotable or removable to facilitate transport.

In some embodiments, two or more of the supports 106 are connected to each other in at least one location to provide additional strength and further reduce movement. This may be provided for by a cross member or tie.

In some embodiments of the present invention that further provide for the tolerance or reduction of vibrations, absorbing and/or damping of the vibrations is done via rubber, polymer composite, or other elastomeric springs and/or pucks. Other types of damping devices may also be used, such as a spring shock, a gas shock, or a combination spring and gas shock. These damping devices may be incorporated into the supports 106 themselves. Additionally or alternatively these damping devices may be provided at the interface between the trailer 102 and the supports 106. Additionally or alternatively these damping devices may be provided at or near the interface between the supports 106 and the ground. A combination of damping devices may be used. For example, a shock absorbing unit (e.g. including a spring) can be incorporated into a shaft of the support, while another unit such as a puck or other deformable material can be located within the footing of the support.

Figure 2:
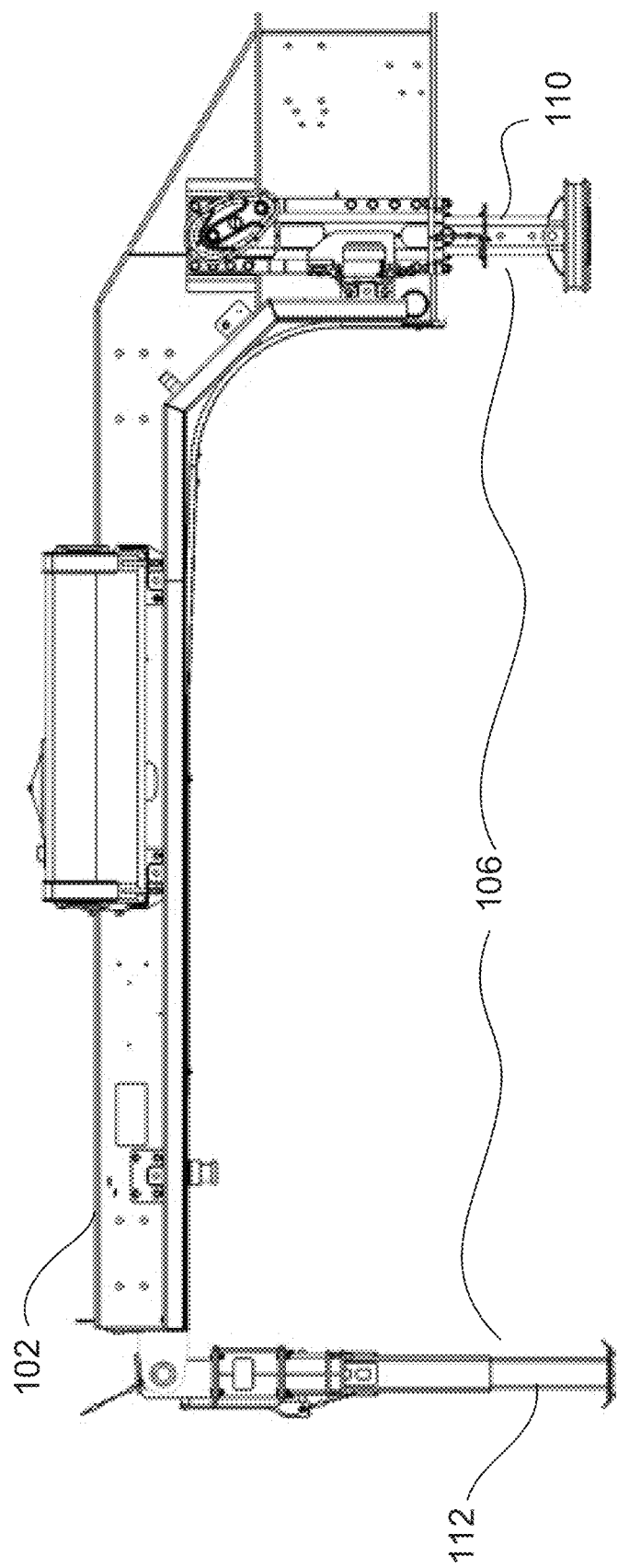
FIG. 2 illustrates the support system of FIG. 1 from a side view, according to an embodiment of the present invention.

FIG. 2 illustrates the example support system 100 of FIG. 1 from a side view.

Figure 3:
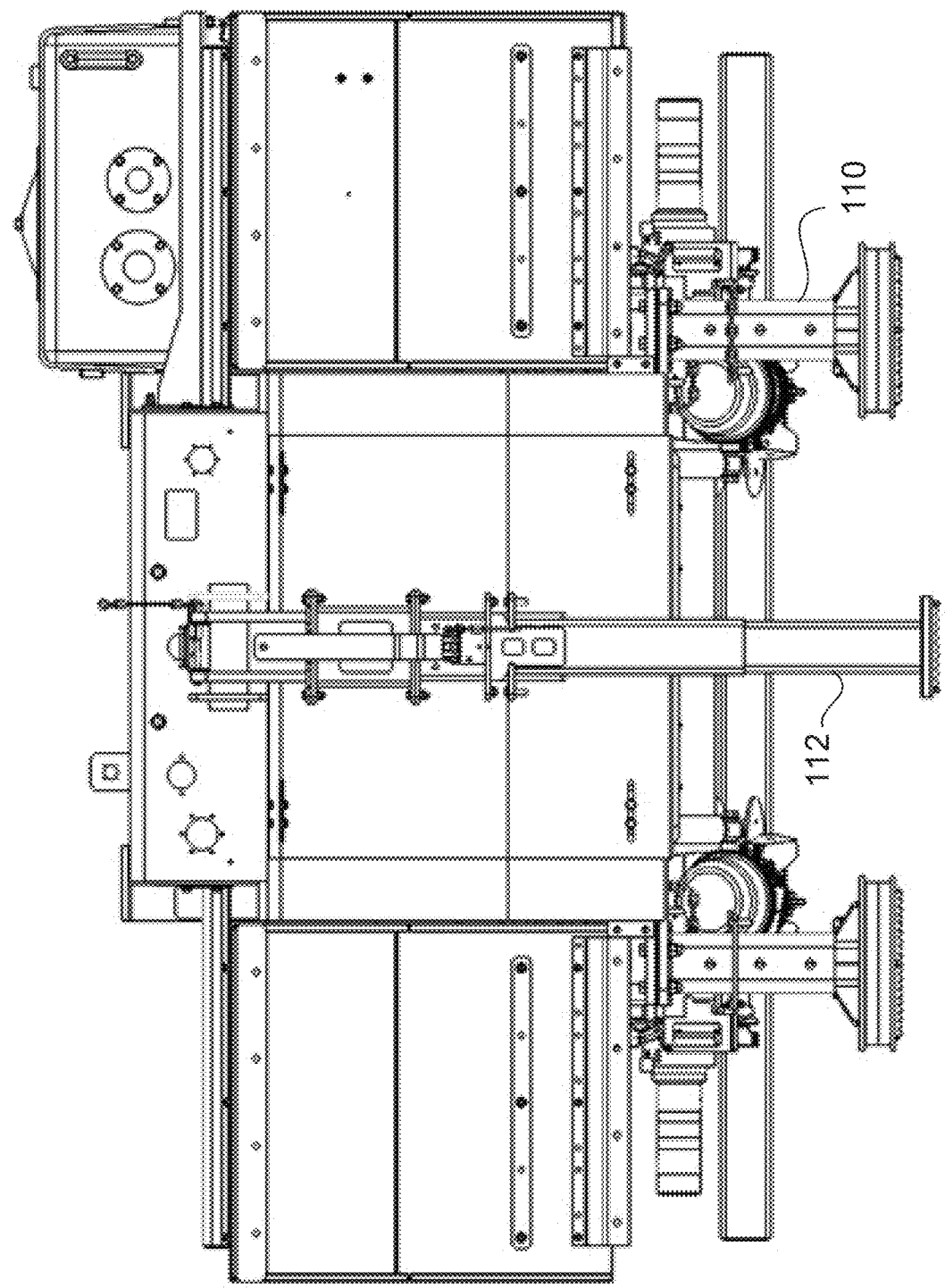
FIG. 3 illustrates the support system of FIG. 1 from a front view, according to an embodiment of the present invention.

FIG. 3 illustrates the example support system 100 of FIG. 1 from a front view.

Figure 4:
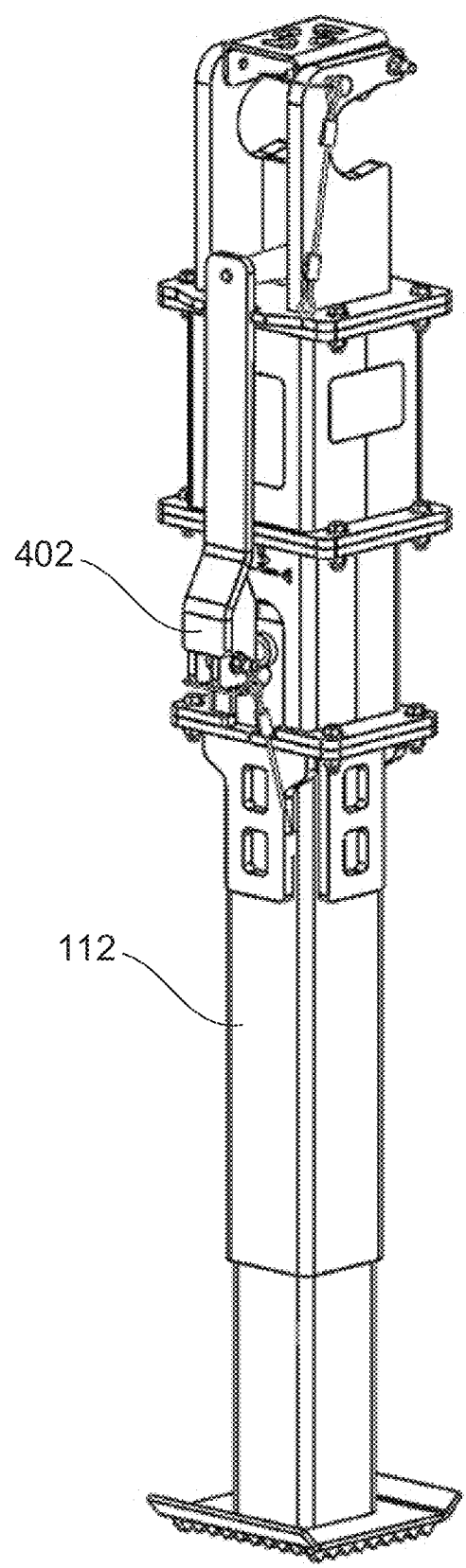
FIG. 4 illustrates a gooseneck support with a crank, according to an embodiment of the present invention.

FIG. 4 illustrates a close-up view of a gooseneck support 112. The height of the gooseneck support 112 may be adjusted manually using the crank 402. In some embodiments, the extension and retraction of the supports 106 is done manually using the crank 402. Suitable mechanical means can be provided for adjusting the length of the gooseneck support 112 using the crank 402. The length-adjustable portion may be different from spring or damper portions of the support 112. As used herein, a crank may be a hand crank or a motorized crank, or another form of crank.

Figure 5:
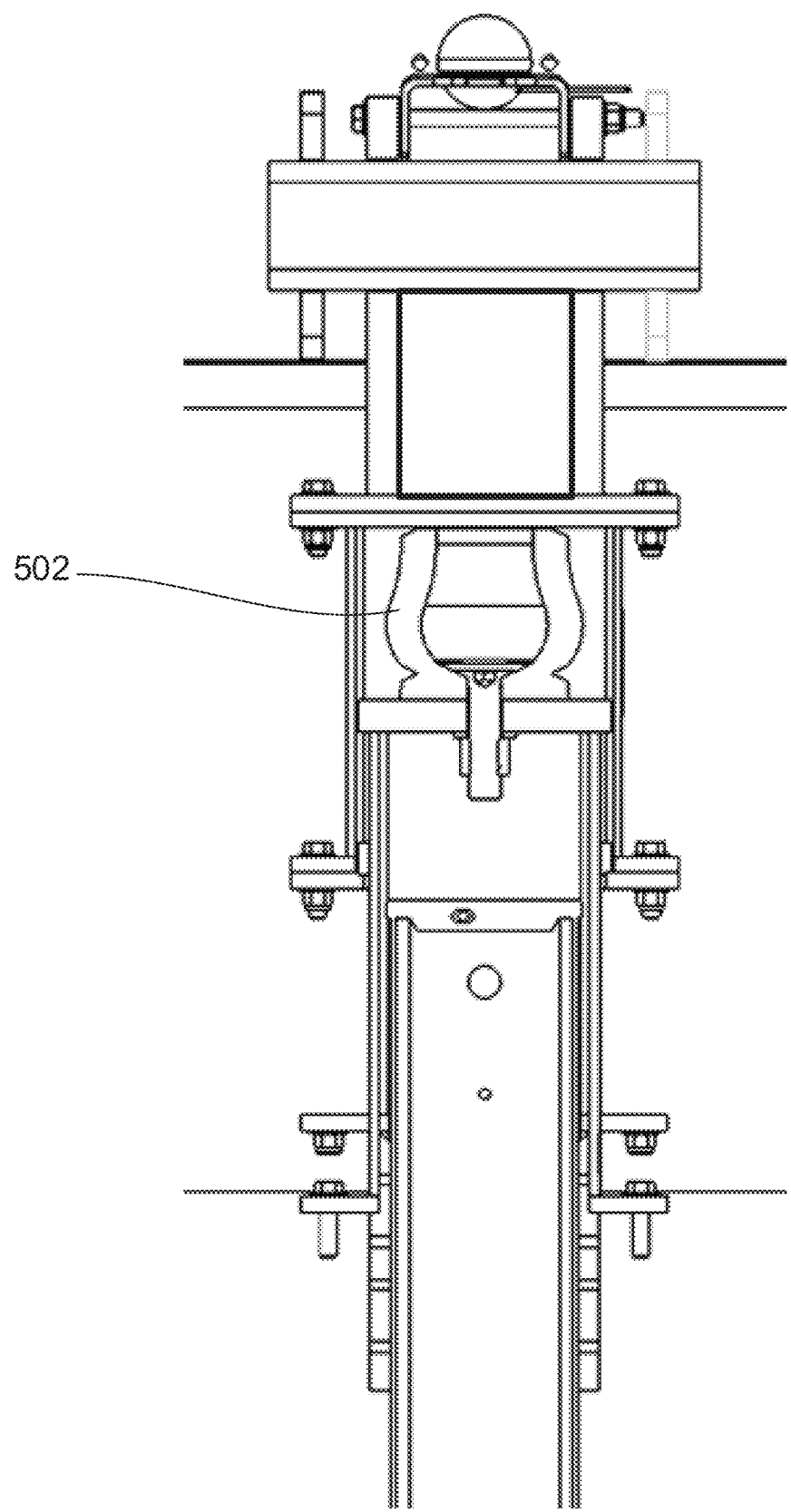
FIG. 5 illustrates a cross section of a gooseneck support showing internal rubber spring, according to an embodiment of the present invention.

FIG. 5 illustrates a cross section of a gooseneck support 112. In some embodiments, vibrations may be reduced by using a rubber, polymer composite, or elastomer spring 502 incorporated within at least one of the supports 106, or in particular the gooseneck support 112. In some embodiments, the gooseneck support 112 may be designed to operate with the spring 502 partially compressed, creating an upwards force on the gooseneck to inhibit or minimize bouncing and vibration.

Figure 6:
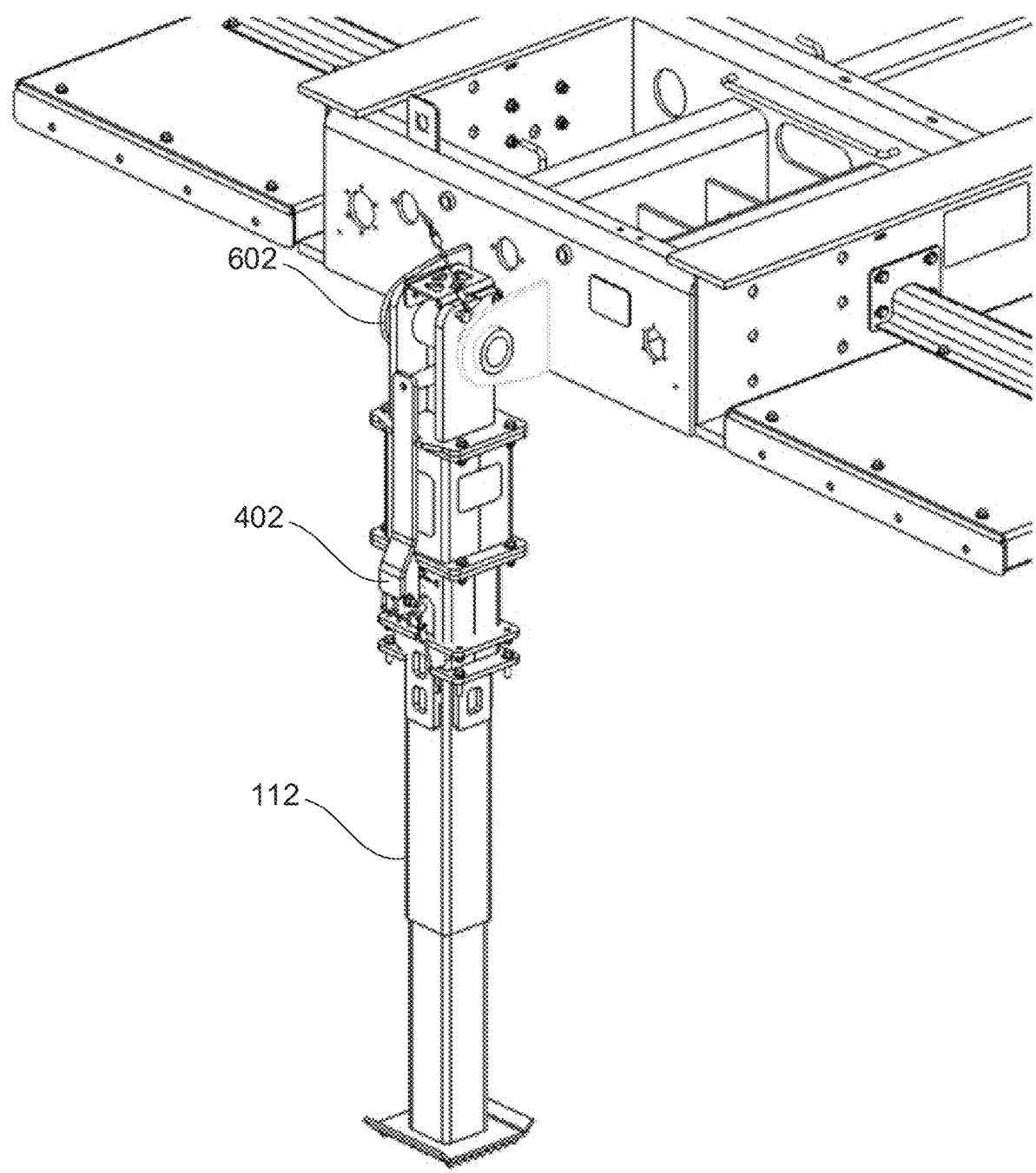
FIG. 6 illustrates a gooseneck support, engaged with a tow bar, according to an embodiment of the present invention.

FIG. 6 illustrates a gooseneck support 112, engaged with a tow bar 602.

Figure 7:
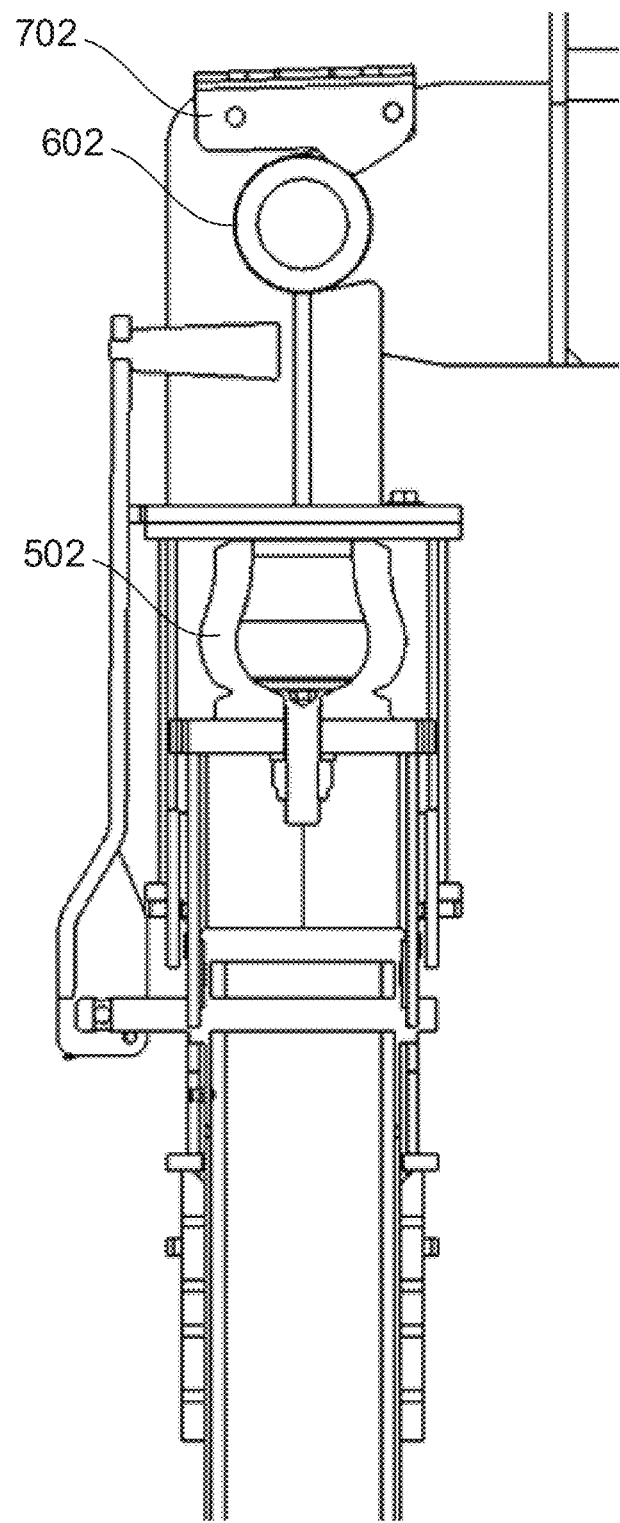
FIG. 7 illustrates a gooseneck support cross section showing engagement with tow bar via pivoting lock, and the internal rubber spring, according to an embodiment of the present invention.

FIG. 7 illustrates a cross section of a gooseneck support 112 showing engagement with a tow bar 602 via a pivoting lock 702, and the internal rubber, polymer composite, or elastomer spring 502. In some embodiments, at least one support 106 attaches to a commonly provided tow bar 602 located on the front end (gooseneck end) of the trailer 102. In cases where no such tow bar 602 is provided, a tow bar 602, or another suitable mounting point, may be welded, bolted, or otherwise attached to the chassis of the trailer 102. In such embodiments, the gooseneck support 112 may be configured to releasably attach to the tow bar 602, so that it can be removed for example in advance of trailer transportation.

In some embodiments, the gooseneck support 112 may be permanently (non-removably) located and mounted on the trailer 102 for transportation.

In some embodiments, the gooseneck support 112 may pivot on the tow bar 602 and rotate up, resting against a support on the trailer 102 during transportation. Thus, the supports may be reconfigurable between a deployed configuration and a transportation configuration. In the deployed configuration the supports are arranged vertically and bear load of the trailer. In the transportation configuration the supports are removed, or pivoted against the trailer body, or retracted, or a combination thereof.

In one embodiment, the gooseneck support 112 attaches to the tow bar 602 with a hook and pivoting retainer. Once attached, the retainer is pivoted to a locking position and pinned in place, the support becoming operatively attached to the tow bar 602.

Figure 8:
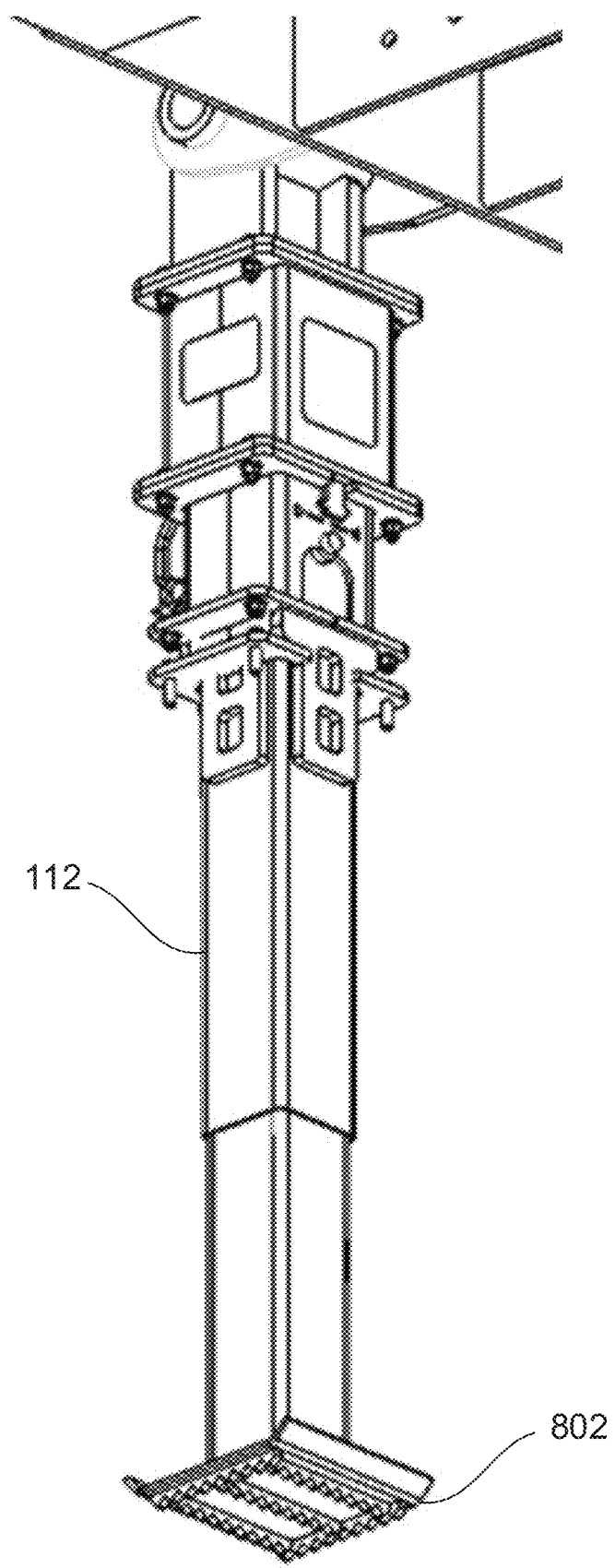
FIG. 8 illustrates a gooseneck support showing an anti-slip device, according to an embodiment of the present invention.

FIG. 8 illustrates a gooseneck support 112 showing an anti-slip device 802. In such embodiments, the bottom of at least one of the supports 106 includes an anti-slip device 802 for increasing grip between the support 106 and the ground or ground cover. This is to inhibit or prevent the bottom of the support 106 from slipping or otherwise moving. This anti-slip device 802 may, for example, be in the form of a high-friction coating, machined teeth ("gripper teeth"), other protrusions such as casings or bolts, or other device for increasing friction with the ground through improved engagement. The anti-slip device can include a roughened, texturized or rubberized base. The portion of the support which contacts ground can be sufficiently large to support the trailer 102 on a given type of bearing surface. The size of this portion of the support can be configured in view of the expected amount of vibration on the trailer during operation, because such vibrations may increase the amount of contact surface required.

Figure 9:
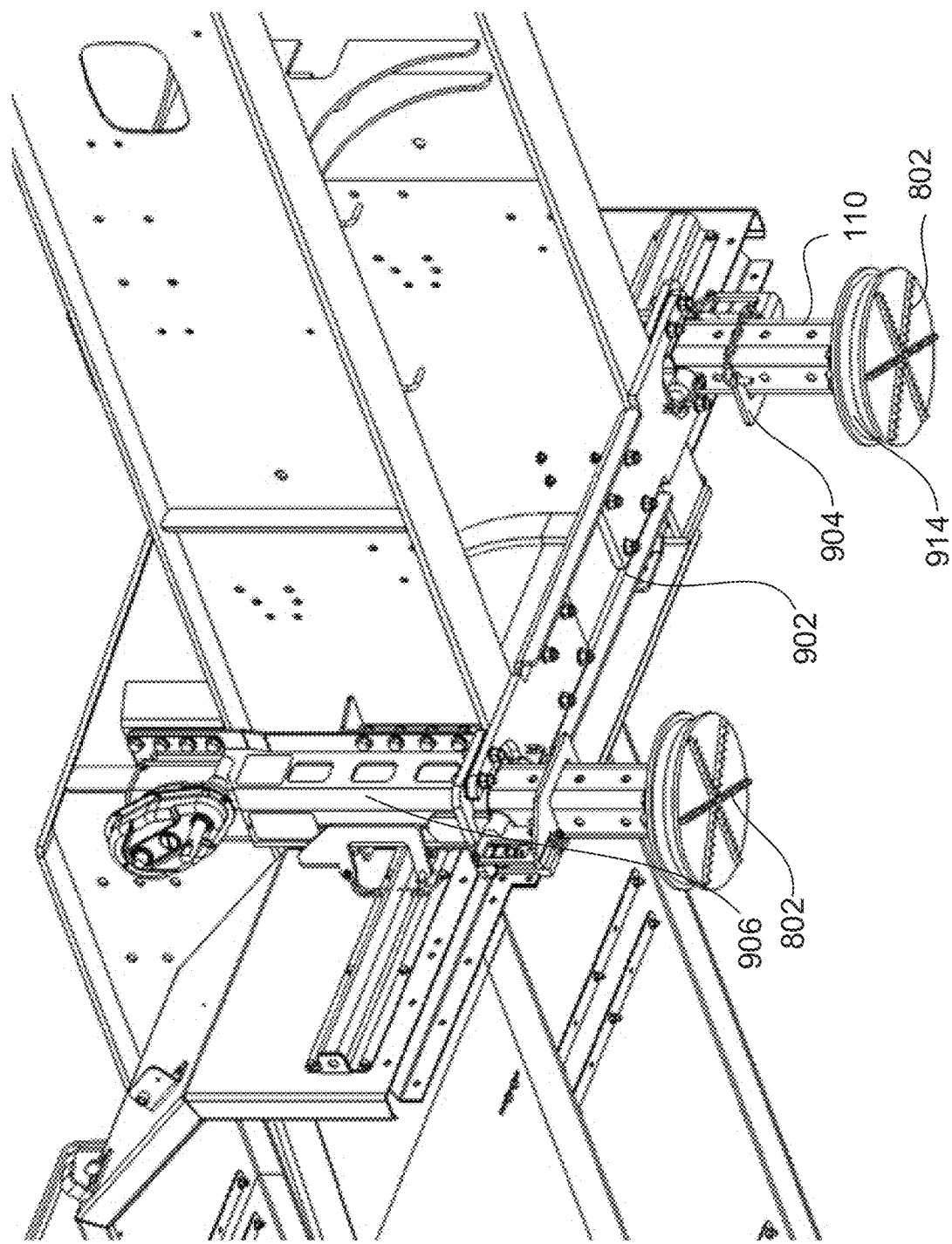
FIG. 9 illustrates landing supports showing cross member connection, an anti-slip device, load-bearing pins, external reinforcement, and isolator pucks, according to an embodiment of the present invention.

FIG. 9 illustrates landing supports 110 showing cross member connection 902, an anti-slip device 802, load-bearing pins 904, external reinforcement 906, and isolator pucks 914. In some embodiments, rubber, polymer composite, or elastomer isolator pucks 914 in the bottom feet of the landing supports 110 are used as dampers to inhibit or minimize vibrations and carry a portion of the weight of the trailer 102. In such an embodiment, the bottom feet may be able to pivot in one or multiple directions to account for uneven terrain and to inhibit or minimize side loading of the support 106.

Figure 10:
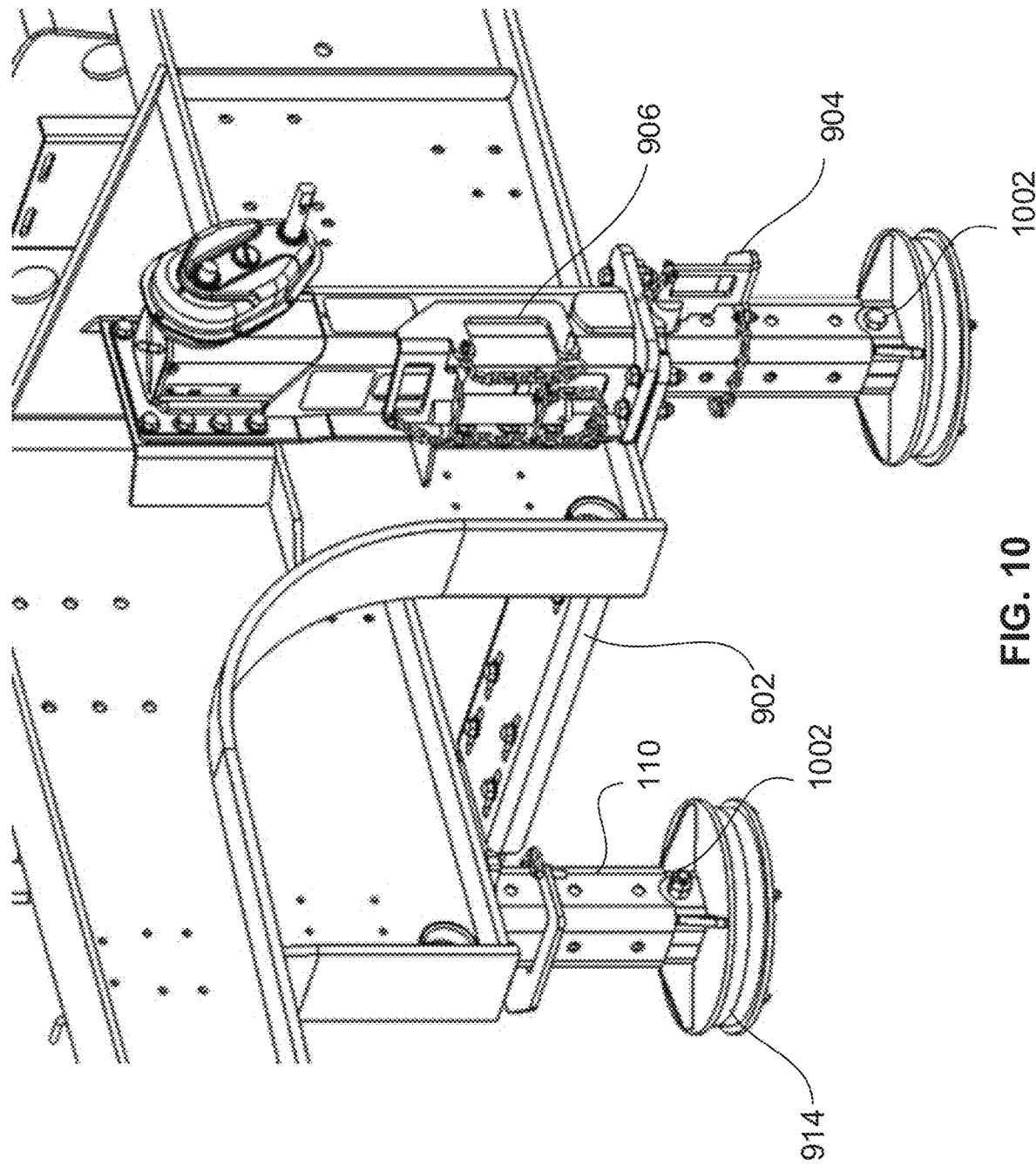
FIG. 10 illustrates landing supports, according to an embodiment of the present invention.

FIG. 10 illustrates the landing supports 110 in greater detail. The landing supports may be extendable and retractable. The landing supports can include an elastomeric, shock absorbing insert 914 sandwiched between two metal footing members.

In some embodiments, the landing supports 110 rest on a through-pin 904 inserted between the upper and lower portions of the telescoping support. This pin 904 becomes the main support interface between the upper and lower portions of the support 110. The threads of the internal screw are only used to extend and retract the support into position. Once the pin 904 is placed, the support is retracted until the pin 904 is contacted, so as to fully (or at least partially) relieve the threads of the internal screw from bearing weight. In some embodiments, a floating pin 1002 may remain permanently installed, allowing the foot of a landing support 110 to float on the rubber insert 914. A pin, or a load bearing mechanism other than a pin (such as a wedge or other mechanical device) can thus be used to relieve weight on the screw threads. This weight relief can be provided during support of the trailer following adjustment of the screw threads. This weight relief can in some cases be provided during some adjustment of the screw threads.

In some embodiments, reinforcement of the supports 106 is provided by modifying typical trailer landing gear, which provides a method for vertical adjustment of the supports, with additional bracing or a new frame altogether. In some embodiments, this bracing may include an internal sleeve or sleeves inserted into the lower telescoping portion of the support. In some embodiments, this bracing may include additional external bracing surrounding either or both telescoping portions of the support. In some embodiments the method of vertical adjustment, typically a screw assembly, is the only substantial portion of typical trailer landing gear that is reused. The landing gear can be vertically adjustable using a previously known type of trailer landing gear vertical adjustment mechanism or another type of trailer landing gear vertical adjustment mechanism.

Figure 11:
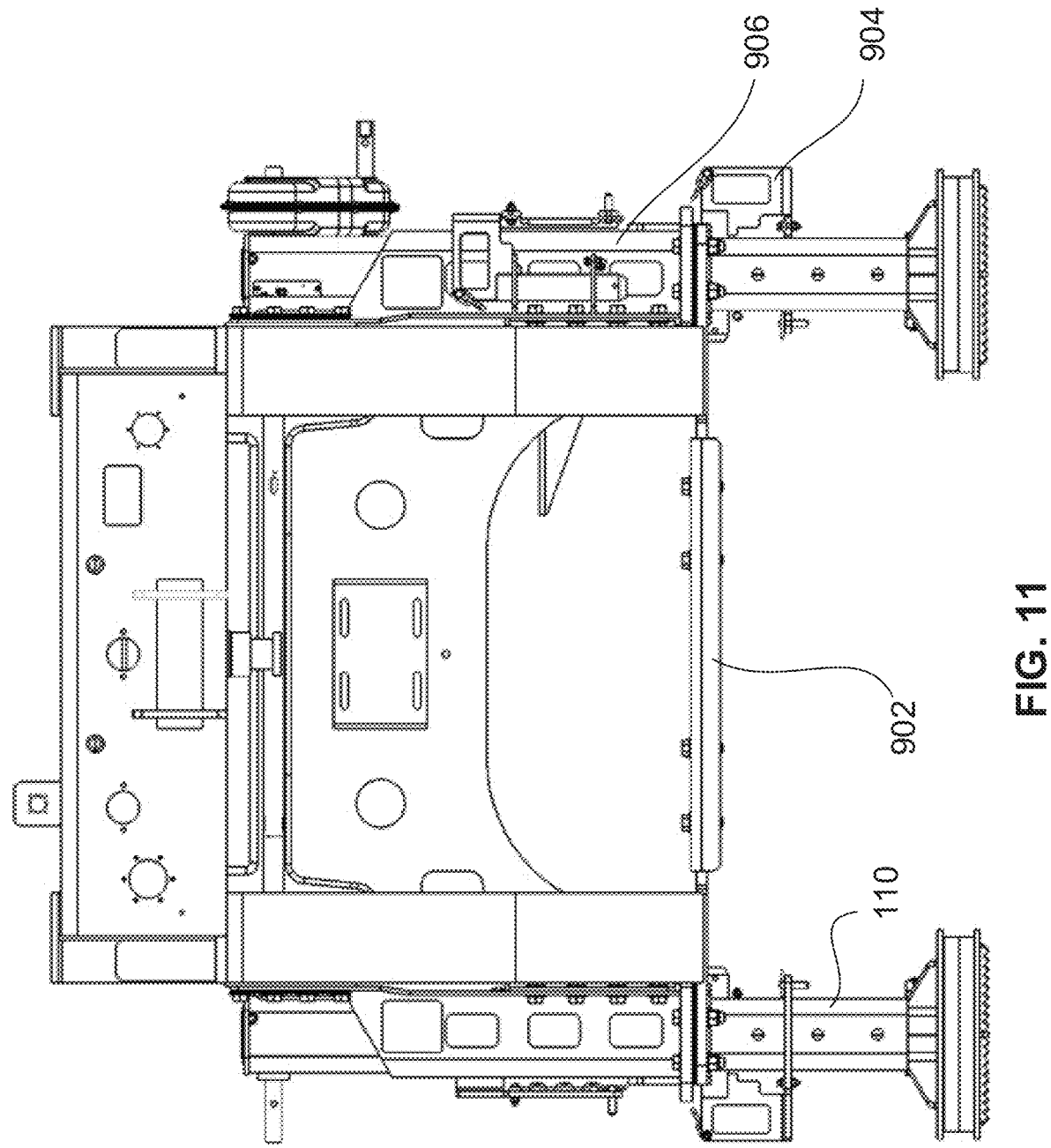
FIG. 11 illustrates the landing supports of FIG. 10 from a front view, according to an embodiment of the present invention.

FIG. 11 illustrates the landing supports 110 from a front view.

Figure 12:
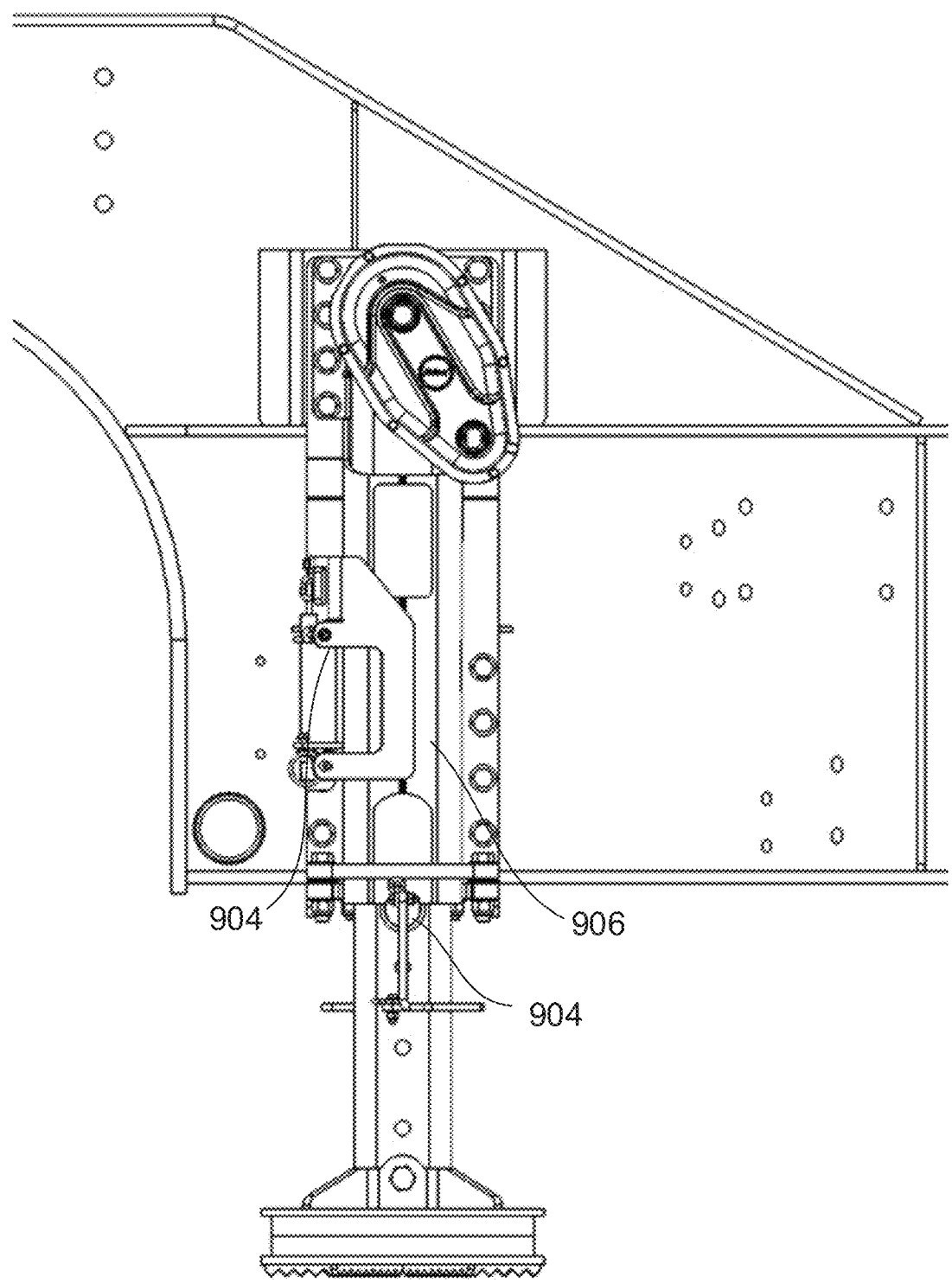
FIG. 12 illustrates a landing support showing the load-bearing pin both inserted and stored on the support, according to an embodiment of the present invention.

FIG. 12 illustrates a landing support 110 showing the load-bearing pin 904 both inserted and stored on the support. (In practice the pin would only be in one of the two illustrated positions at any given time.) In some embodiments, additional reinforcement is provided where the load-bearing pin 904 rests against the internal sleeve on the lower portion of the landing support 110. In some embodiments, additional reinforcement is provided where the load-bearing pin rests against the external reinforcement 906 on the upper portion of the landing support 110.

In some embodiments, the load-bearing pin 904 for the landing supports 110 can be inserted into a holder or mount on the landing support 110 when not in use, for the purpose of storage.

Figure 13:
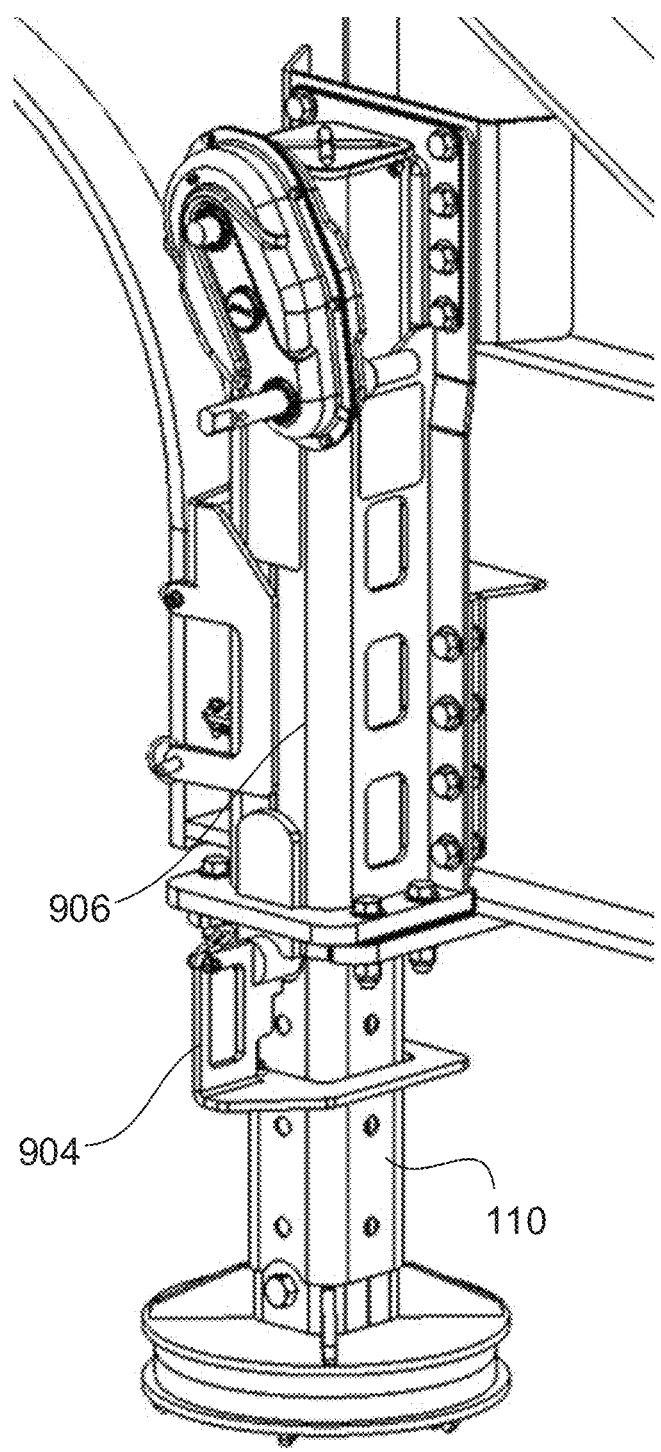
FIG. 13 illustrates a single landing support, according to an embodiment of the present invention.

FIG. 13 illustrates a single landing support 110 in more detail.

Figure 14:
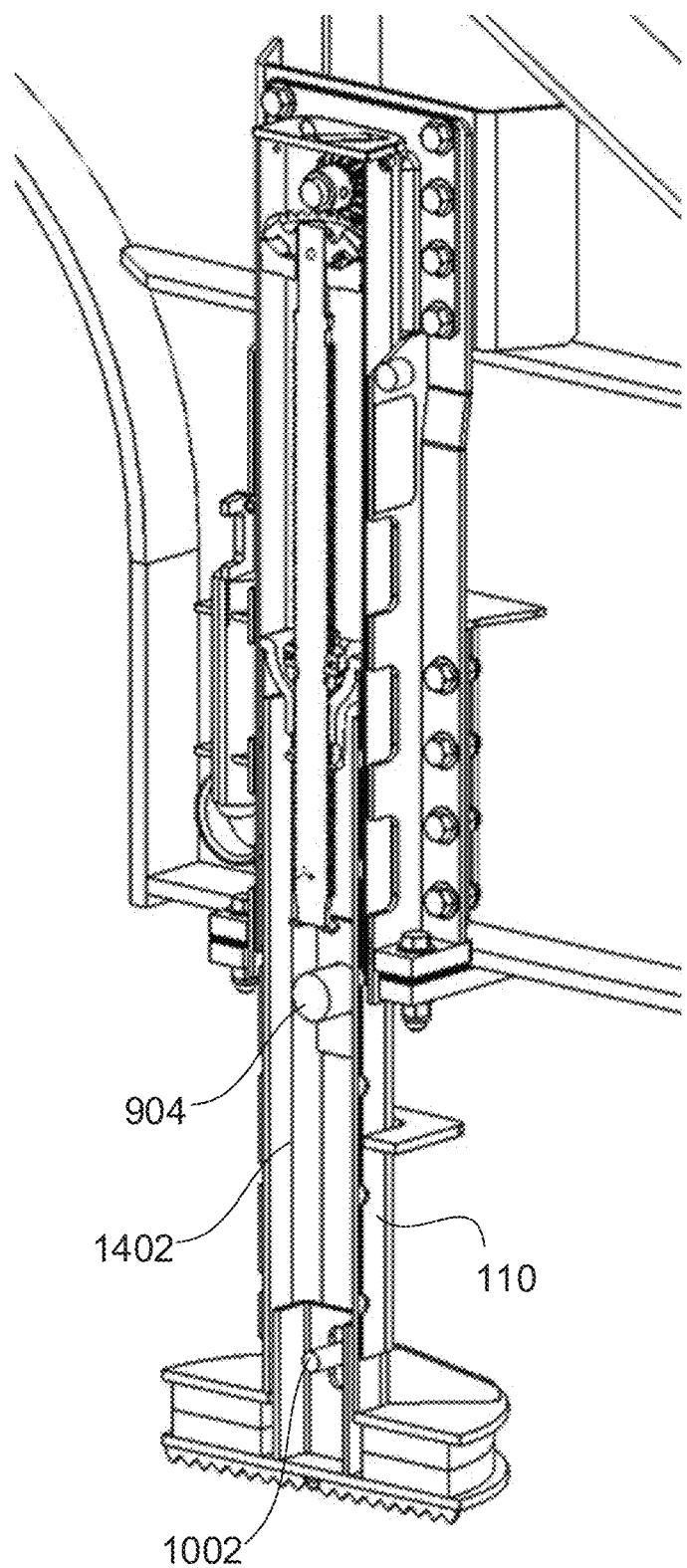
FIG. 14 illustrates a landing support cross section showing internal reinforcing sleeve, and additional reinforcement at pin insertion location, according to an embodiment of the present invention.

FIG. 14 illustrates a cross section of a landing support 110 showing internal reinforcing sleeve 1402, and additional reinforcement at pin 1002 and pin 904 insertion locations.

In one such embodiment, the mounts between the supports 106 and the trailer 102, and/or connections between the supports 106, are designed to be adjustable and substantially universal through the use of slotted or multiple machined bolt holes.

In another embodiment, pads may be recommended and/or provided to be placed between the supports and the ground or ground cover. These pads may be made of rubber, wood, or any other material designed to support and distribute the weight of the trailer. Pad size may be selectable based on conditions, such as trailer weight, amount of vibration of trailer-mounted equipment, ground terrain type, or a combination thereof.

In one such embodiment, one or more of the supports 106 include an indicator to show when the supports 106 are properly compressed and require no additional lifting force. This indicator may be a window with a sticker or other marker that will become aligned when under a known compressive force. In some embodiments, the indicator may be adjustable (e.g. scalable or configurable) to accommodate a plurality of different trailer configurations or weights.

Figure 15:
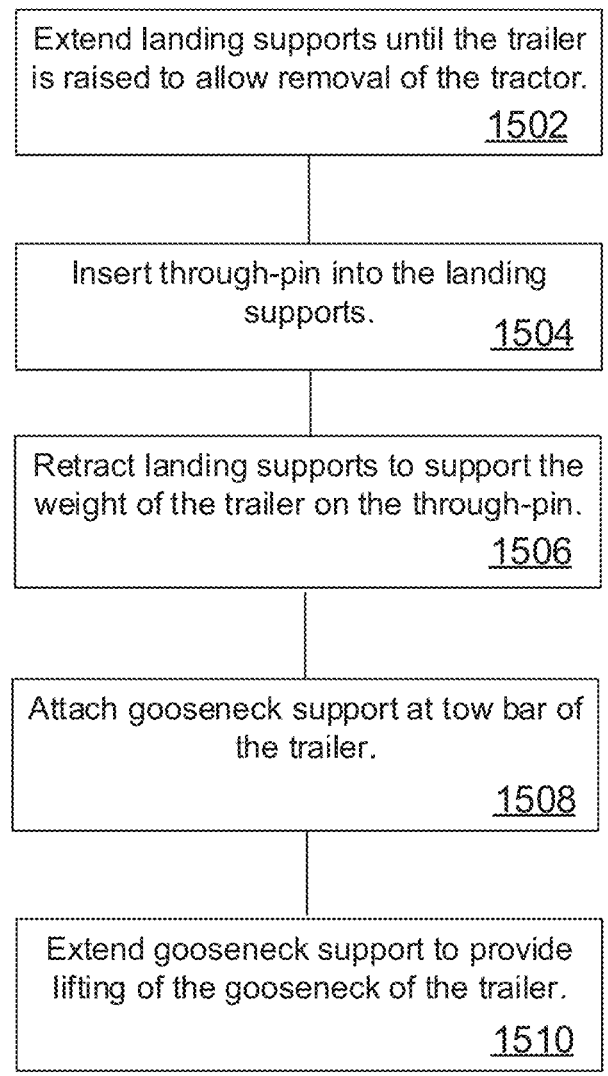
FIG. 15 depicts a method for supporting the weight of an operating hydraulic fracturing trailer when unsupported by a tractor, according to an embodiment of the present invention.

FIG. 15 depicts a method 1500 for supporting the weight of an operating hydraulic fracturing trailer 102 when unsupported by a tractor. The method 1500 comprises a first step 1502 of extending landing supports 110 until the trailer 102 is raised to allow removal of the tractor. The extension of landing supports 110 may be accomplished using a crank. The method 1500 further comprises step 1504 of inserting a through-pin 904 into the landing supports 110. Once the pin 904 is inserted, the method 1500 includes step 1506 retracting the landing supports 110, allowing the weight of the trailer to be supported by the rear axles and the through-pins 904. The method 1500 further includes step 1508, attaching the gooseneck support 112 and positioning it to the tow bar 602. The gooseneck support 112 can be readily oriented perpendicular to the ground due to gravity. The attachment point is secured using a pivoting retainer which is pinned in place. The method 1500 finally includes step 1510 where the gooseneck support 112 is extended until it engages with the ground. The gooseneck support 112 may be extended via a crank.

The gooseneck support 112 may be extended further, providing some amount of lifting force on the gooseneck, until the internal rubber, polymer composite, or elastomer spring 502 is compressed an appropriate amount to provide desired damping. The appropriate amount of compression is recognized through the alignment of certain indicators that have been scribed, stamped, engraved, or otherwise marked on the inside/lower and outside/upper portions of the telescoping gooseneck support 112. Once these indicators are aligned, the gooseneck of the trailer is ideally supported and operations may begin. The indicator allows the operator to easily gauge if an adjustment is required during continuous operation.

In some embodiments, during operation, the gooseneck support 112 indicators should be periodically inspected and possibly adjusted to maintain the proper spring compression. This variability may be caused by ground compression or other factors.

In some embodiments, the method of removing the supports 106 from a trailer involves first raising the gooseneck support 112 and repositioning it or removing it from the trailer. Next, the landing supports 110 are extended until the weight of the trailer 102 is born by the internal lifting screws, and the trailer 102 is raised to an elevation sufficient for a tractor to engage the kingpin. Once the kingpin is engaged with a tractor, the landing support 110 pins may be removed and the supports 106 retracted completely to maximize ground clearance for transportation.

Although the present invention has been described with reference to specific features and embodiments thereof, it is evident that various modifications and combinations may be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A system for supporting the weight of a trailer holding mechanical equipment when unsupported by a towing tractor, the system comprising:
    at least one support structure extending from the trailer toward ground and configured to partially support the trailer when in contact with ground, in addition to any axle groups that exist on the trailer; and
    at least one device configured to absorb, damp, or both absorb and damp vibrations from the mechanical equipment during operation of the mechanical equipment while supported on the trailer, wherein each of the at least one devices is operatively coupled to a corresponding one of the at least one support structures.

2. The system of claim 1, wherein the at least one device is included within or is coupled in series with said corresponding one of the at least one support structures.

3. The system of claim 1, wherein the at least one device comprises a spring or a damper or a device operating as both spring and damper, located internally within said corresponding one of the at least one support structures.

4. The system of claim 3, wherein the spring is a rubber, polymer composite, or elastomer spring.

5. The system of claim 1, wherein the at least one device comprises a rubber, polymer composite, or elastomer isolator which is operatively coupled to a moveable foot of said corresponding one of the at least one support structures.

6. The system of claim 1, wherein at least three support structures are provided, and wherein each of the at least three support structures is operatively coupled to a different corresponding one of said devices.

7. The system of claim 1, wherein at least one of the support structures remain fixed to the trailer during operations and during transportation.

8. The system of claim 1, wherein at least one of the support structures is coupled to a gooseneck or other overhung or cantilevered portion of the trailer.

9. The system of claim 8, wherein at least one of the support structures is coupled to the trailer at a location at or proximate to a front of the trailer.

10. The system of claim 8, wherein the support structure is pivotably coupled to a tow bar or other towing attachment of the trailer, and wherein, in preparation for towing,. the support structure is pivotable away from ground or removable from the tow bar or other towing attachment.

11. The system of claim 1, further comprising an anti-slip device located on bottom of at least one of the support structures to inhibit slipping or skipping.

12. The system of claim 1, wherein the support structures are based on a frame of typical trailer landing gear.

13. The system of claim 1, wherein at least one of the support structures includes an indicator to show, to an operator, that the at least one device is under a compression force matching a predetermined design compression force, the predetermined design compression force being configured to cause the at least one device to provide a corresponding design amount of damping of the vibrations from the mechanical equipment.

14. The system of claim 1, wherein at least two of said support structures are provided, the system further comprising a crossmember connecting at least two of the support structures.

15. The system of claim 1, wherein one or more of the at least one support structure is extendable and retractable using a screw thread mechanism, the system further comprising at least one load bearing mechanism configured to carry at least a portion of the weight of the trailer to relieve force applied to the screw thread mechanism during operation of the screw thread mechanism, during operation of the support structure to support the trailer, or both.

16. The system of claim 1, wherein the at least one support structure is separate from said any axle groups that exist on the trailer and wherein the at least one support structure is also separate from any axle groups that are separate from and support the trailer.

17. A method for supporting the weight of an operating hydraulic fracturing trailer when unsupported by a tractor, the method comprising:
    providing at least one support structure extending from the trailer toward ground and configured to partially support the trailer when in contact with ground, in addition to any axle groups that exist on the trailer; and
    providing a device configured to absorb and/or damp vibrations from the hydraulic fracturing equipment operating on the trailer, the device integrated into one of the at least one support structures.

18. The system of claim 1, wherein configuring one of the at least one devices comprises pre-compressing said one of the at least one devices by a particular amount to cause a corresponding vibration absorbing or vibration damping action.

19. The system of claim 1, wherein one of the at least one devices comprises an elastomeric insert sandwiched between two metal footing members of one of the at least one support structures.

20. The system of claim 1, wherein one of the at least one devices comprises a spring located in an upper portion of one of the at least one support structures.

21. The system of claim 1, wherein:
    a first one of the support structures comprises a spring located in an upper portion thereof; and
    second and third ones of the support structures each comprise an elastomeric insert sandwiched between two metal footing members,
    the first one of the support structures being located at a front of the trailer and the second and third ones of the support structures being located rearward of the first one of the support structures.

* * * * *